Jan. 28, 1969   G. G. KORINEK   3,424,506
DEVICE FOR OILING BEARINGS
Filed Jan. 13, 1967

INVENTOR
GORDIN G. KORINEK
BY
Herbert A. Winterurn
ATTORNEY

United States Patent Office 3,424,506
Patented Jan. 28, 1969

3,424,506
DEVICE FOR OILING BEARINGS
Gordon G. Korinek, Menominee, Mich., assignor to Vernco Corporation of Tennessee, Newport, Tenn.
Filed Jan. 13, 1967, Ser. No. 614,764
U.S. Cl. 308—132     6 Claims
Int. Cl. F16c 1/24, 33/66, 13/02

ABSTRACT OF THE DISCLOSURE

A device for oiling a bearing contained in a bearing housing having a bibulous oil receiving member and an oil supply tube which extends through the housing for supplying oil to the bearing. The oil supply tube has an abutment on the outer extremity thereof which is the sole means for limiting travel of the tube outwardly from the bearing housing.

---

This invention relates to means for lubricating a bearing to which is applied a felt body constituting an oil reservoir. Oil is fed to this body through a tube with an externally flanged end. The felt is carried within a chamber into which the bearing appears. This chamber has a wall provided with a hole through which the tube is passed with a close fit outwardly to have the end flange maintained in abutment against the inner face of the chamber by pressure of the felt therein.

Several advantages of the invention are apparent. The tube is yieldingly held in fixed position. The juncture of the inner end of the tube with the felt is pressure maintained to insure that the oil enters the felt body without bypassing the felt. The tube may be made of plastic with the flange rolled back onto the tube in the nature of a cuff. The bearing proper may move relative to the felt without disturbing the imbedded tube end juncture with the felt whereby the felt is not tended to be worked out of the chamber. Reduction of the number of parts, machine work, and time of assembly is had as compared with the requirements of heretofore known oiling structures for like bearings.

One particular form of the invention as applied to a specific bearing for a small electric motor is illustrated and described herein in reference to the accompanying drawing, in which.

Figure 1:
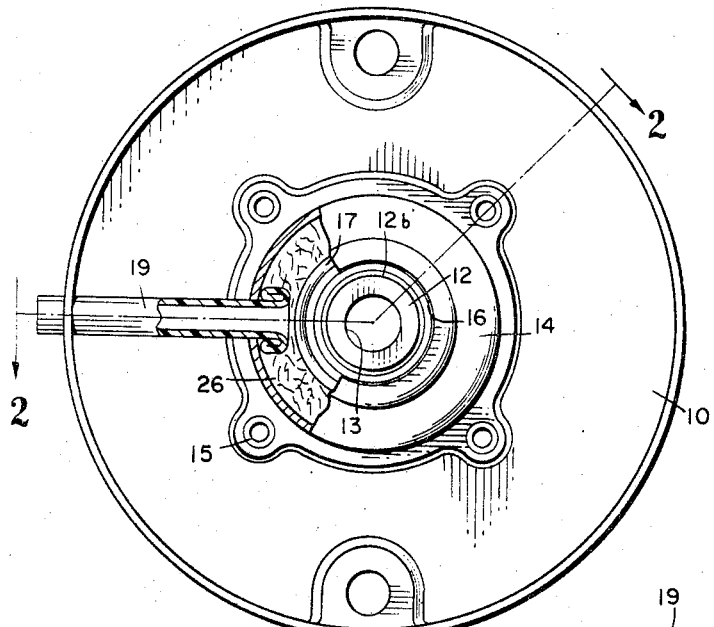
FIG. 1 is an elevational view in partial section from the inside of a motor end housing to which the invention is applied.
Figure 3:
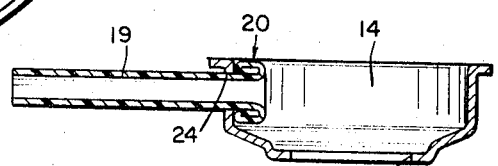
FIG. 3 is a view in central vertical section of a felt and oil tube retaining cup.

A motor housing end 10 is shown to be in the nature of a cup and to be provided with a central, semispherical outwardly bulging, bearing receiving portion 11.

A bearing 12 has a semispherical end 12a rockably fitting into this portion 11 from the inside of the end 10. The bearing 12 extends to within the housing by a portion terminating in an externally annular portion 12b. A shaft receiving bore 13 extends centrally longitudinally through the bearing 12.

A cap 14 is fixed against the inner face of the housing end 10 by any suitable manner, herein shown as by rivets 15, four in number, which retain the cap 14 and an opening 16 concentric with the longitudinal center line of the housing portion 11. A coil spring 17 bears by one end around a recess 18 provided at the margin of the opening 16, and by its other end in the annular portion 12b of the bearing 12. In that manner, the bearing 12 is yieldingly maintained by its semispherical surface within the housing end like surface.

The structure so far described is found within the prior art where a self-aligning bearing is provided.

Figure 4:
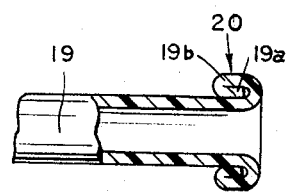
FIG. 4 is a view on an enlarged scale of the lower, flanged end of the oil tube.
Figure 5:
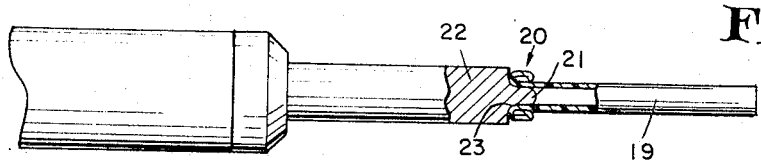
FIG. 5 is a side view in partial section of one particular apparatus for flanging a plastic tube.

To this structure is brought an oil tube 19. This tube is preferably made of a resilient plastic, heat deformable material. A flange, or what may be termed a cuff 20 is formed on one end of the tube by any suitable procedure. One low-cost method has been discovered in that a length 19 of a plastic tube is pressed over a nipple 21 of a heated head 22. The temperature of this head and consequently of the attached nipple is maintained within that range which will cause the plastic to soften or at least be deformable by pressing the tube 19 longitudinally over the nipple 21 against an annular, concave fillet 23 around the juncture of the nipple 21 with the body 22. As the tube 19 is so pressed, the tube end portion flows in effect to turn wrong side out in a curling action to fold along the outer side of the tube and turn inwardly along the tube to terminate by an inner short length 19a between the tube wall and an outer short length 19b, FIG. 4. When the tube 19 is withdrawn from over the nipple 21, the plastic cools and takes a permanent set.

Figure 2:
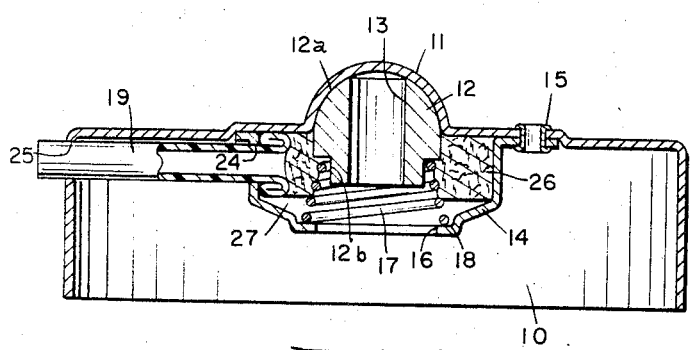
FIG. 2 is a view in central vertical section on the line 2—2 in FIG. 1 and on an enlarged scale.

The tube 19, so formed, is inserted from within the cap 14 through a hole 24 in the cap side to have the cuff or flange 20 abut the cap hole marginal area and extend on approximately radially outwardly through a hole 25 in the side of the housing end 10, FIGS. 1 and 2 to protrude therethrough by a desired length.

A body 26 of a bibulous nature, preferably a wool felt, is inserted in the cap 14 after the mounting of the tube 19 thereon and prior to the assembly of the cap and spring with the bearing and housing end. This body 26 is depressed immediately under and around the flange 20 and thus retains the tube 19 in longitudinally fixed position. The body 26 also surrounds the end portion of the bearing 12 within the chamber 27 formed within the cap 14 and the housing end 11. This body 26 further surrounds the spring 17 which, being conical as in the present showing is a retardant against longitudinal travel of the chamber 27 in addition to the entrance of the flanged end of the tube into the body.

Oil dropped into the upper end of the tube 19 flows down to the body 26 where the oil distributes itself throughout the various and multitudinous cells and passages. Oil will feed from this body 26 to the external surface of the bearing 12. From this surface, the oil will feed to the spherical surfaces of the bearing and housing end, and particularly, will feed over the inner end of the bearing 12 to the shaft (not shown) entered in the bore 13. The body 26 preferably overlaps the inner end of the bearing 26 as shown in FIG. 2, to facilitate oil flow to the bearing bore 13 by way of the shaft.

While the tube 19 is shown in a horizontal position in the several views in the drawing in order to present all of the views on the one sheet, normally, the housing 10 and cup 14 will be in rotated positions to place the tube 19 in a vertical position to facilitate flow of oil to the body 26.

It is intended that the drawing and description of the invention herein presented be but the one best form now known, but that it is conceivable that changes may be made from that form such as in the mechanical form of the bearing and its retainer and in the materials of the oil tube and of the body 26 or wick, all within the scope of the appended claims.

I claim:

1. In a device for oiling bearings, the combination with a bearing, a bearing carrier, a bibulous oil receiving member around a portion at least of said bearing, and a member snugly containing that bibulous member; of
an oil supply tube;
said container member having an opening therethrough;
said tube extending through said opening;
said tube being tended to be expelled through said opening by pressure of said bibulous material thereagainst; and
an abutment on an end portion of said tube in the path of the margin of said container opening and within the container as the sole means for limiting travel of the tube outwardly from the container member.

2. The structure of claim 1, in which
said abutment has a longitudinal length requiring the end of said tube to be imbedded in said bibulous member.

3. The structure of claim 2, in which
said bibulous material is resilient in nature and retains outwardly directed pressure on the tube end.

4. The structure of claim 1, in which
said containing member comprises a cup and a spring between the cup and the bearing carrier; and
said bibulous member overhangs the bearing in the direction of said spring.

5. The structure of claim 1, in which
said abutment comprises an outwardly turned portion of said tube end.

6. The structure of claim 5, in which
said outwardly turned tube end portion has a longitudinal length determining the depth of the tube end imbedment in said bibulous material.

References Cited

UNITED STATES PATENTS

| 2,504,448 | 4/1950 | Dachlin | 138—109 |
| 3,008,777 | 11/1961 | Wightman | 308—132 |

FOREIGN PATENTS 938,941   4/1948   France.

HOUSTON S. BELL, JR., *Primary Examiner.*

U.S. Cl. X.R.

29—149.5